United States Patent Office 3,229,816
Patented Jan. 18, 1966

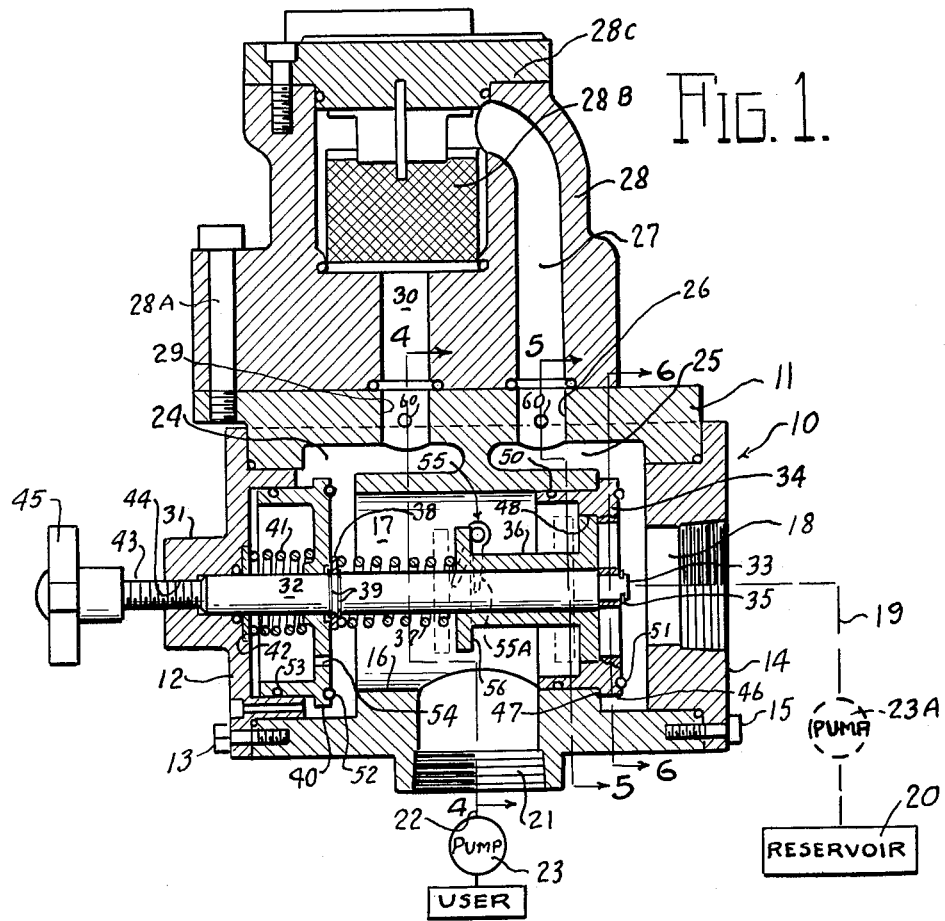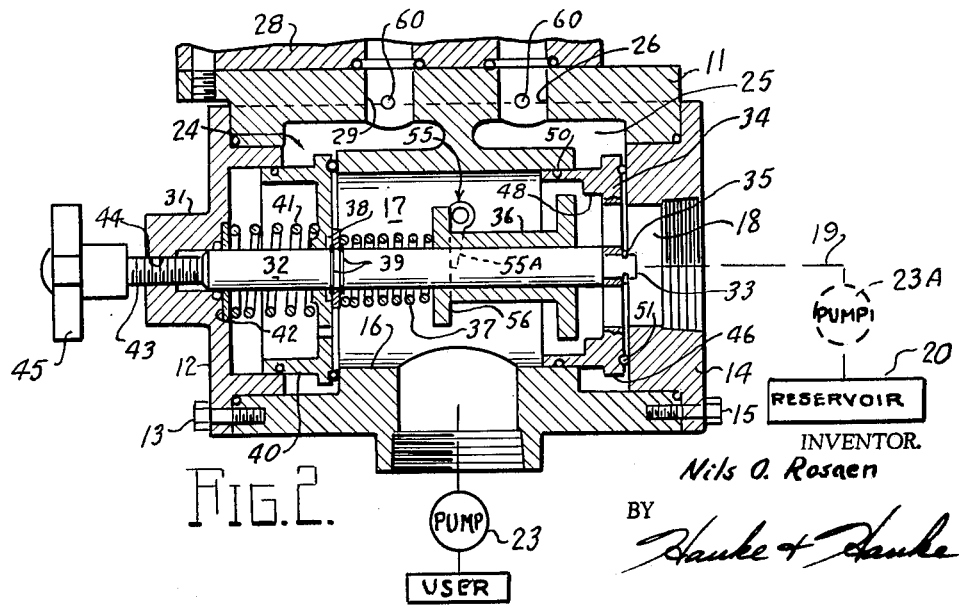

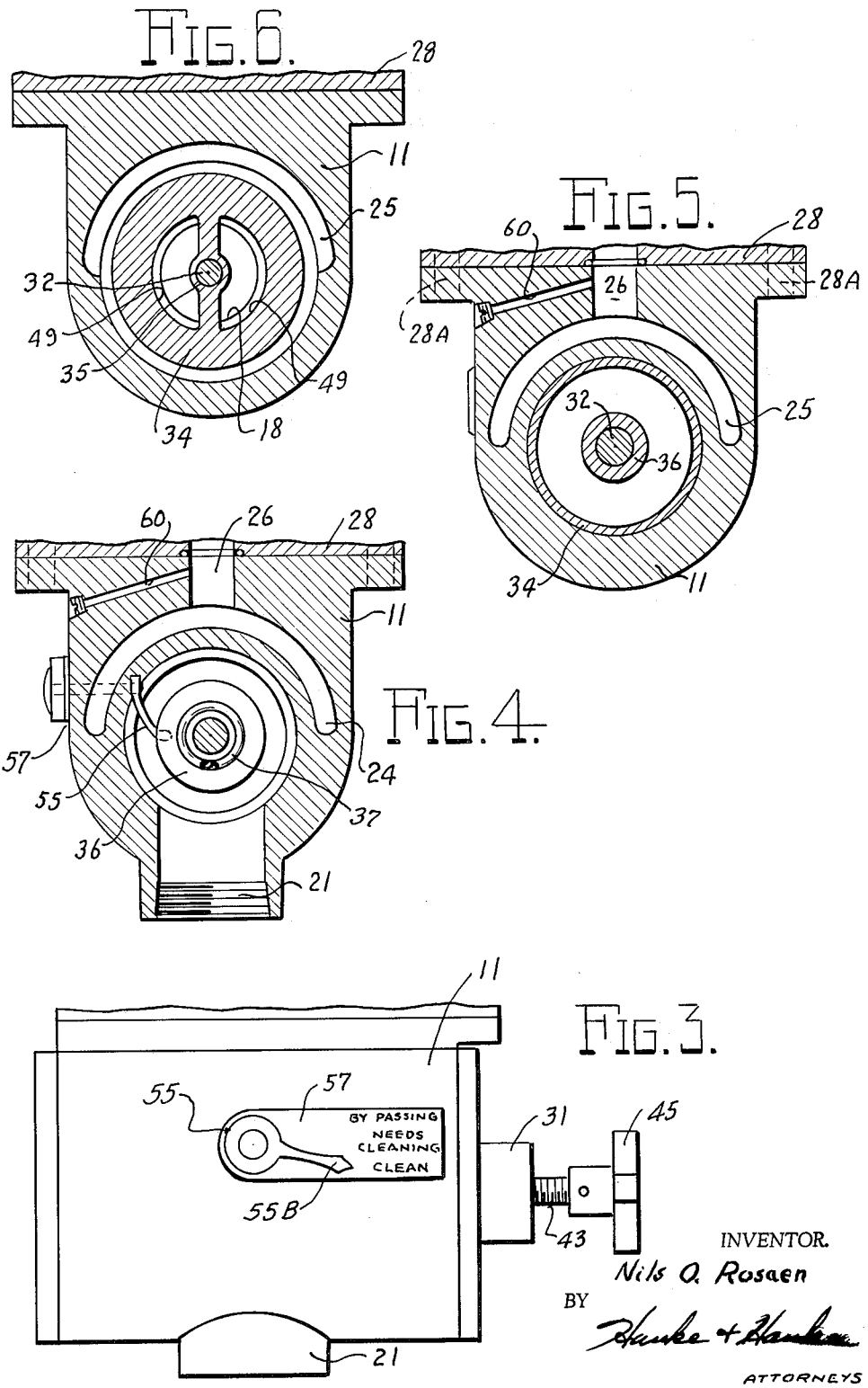

3,229,816
FLOW CONTROL FITTING
Nils O. Rosaen, Bloomfield Hills, Mich., assignor to The Rosaen Filter Company, Detroit, Mich., a corporation of Michigan
Filed Feb. 5, 1962, Ser. No. 170,948
8 Claims. (Cl. 210—130)

The present invention relates to a fluid system fitting and more particularly to an improved four-way valve fitting to be used in conjunction with a fluid filter and which is provided with a forewarning means indicating the condition of the filter, internal relief means permitting the fluid to bypass the filter when it has become clogged, and a shutoff system isolating the filter so that it can be removed while the system is operating.

Many if not all industrial uses of fluid systems require that the fluid being used be filtered in order to insure against damage to working components caused by foreign particles, dirt or abrasives finding their way into the system. Filters used for this purpose eventually become clogged resulting in a diminishing flow of fluid to the user. My prior Patent No. 2,936,731, issued May 17, 1960, discloses a fitting which provides a substantially constant flow of fluid regardless of the condition of the filter by providing a bypass means which acts to provide indication of filter condition and, when the pressure differential reaches a danger point, opens proportionately to the clogged condition of the filter. However, even with such a device the filter must eventually be replaced or cleaned. Ordinarily, cleaning or replacing the filter requires that the operation of the system be stopped until cleaning or replacement is finished.

In the alternative, an expensive and complex system of valves and bypass pipes could be provided to direct the fluid around the filter while it is being cleaned or replaced. The problem of such a system, however, apart from cost, size and inherent maintenance, manufacturing, and installation problems, is that after the filter is cleaned the valves may be improperly operated or forgotten, resulting in damage to other system components.

It is an object of the present invention to produce a simplified and convenient means for cleaning or replacing the filter in a fluid system without necessitating the stoppage of flow in the system by providing a fitting having selectively operable means bypassing the filter.

It is another object of the present invention to provide a fitting to be used in combination with a filter and which is provided with means automatically and variably providing a fluid bypass around the filter proportionately to the degree of clogging taking place at the filter.

Still another object of the present invention is to provide such a fitting with means for indicating the degree of clogging of the filter and the amount of fluid bypassing the filter, and additionally indicating whether the filter is connected into the system.

Still further objects and advantages of the present invention will readily occur to those skilled in the art to which it pertains upon reference to the following drawings in which like reference characters refer to like parts throughout the several views and in which FIG. 1 is a cross-sectional view of a fitting and filter assembly embodying the present invention and illustrating a normal operating position.

FIG. 2 is a cross-sectional view similar to FIG. 1 but illustrating a closed position of the fitting and with the filter assembly deleted for clarity.

FIG. 3 is an elevational view illustrating the filter condition indicating means of the present invention.

FIG. 4 is a cross-sectional view of the fitting of the present invention taken substantially at line 4—4 of FIG. 1.

FIG. 5 is a cross-sectional view taken substantially at line 5—5 of FIG. 1, and

FIG. 6 is a cross-sectional view taken substantially at line 6—6 of FIG. 1.

Now referring to the drawing for a more detailed description of the present invention, FIG. 1 illustrates a preferred fitting 10 as comprising a substantially cylindrical housing 11, a cap member 12 is secured to one end of the housing 11 by any convenient means such as bolts 13 and an end member 14 is secured to the end of the housing 11 opposite the cap member 12 by any convenient means such as bolts 15.

The housing 11 is provided with a central bore portion 16 which with the cap member 12 and the end member 14 defines a central chamber 17. The end member 14 is provided with an inlet 18 adapted for connection to an inlet conduit 19 or the like to provide communication between a reservoir or other fluid supply means 20 and the central chamber 17. The housing 11 is also provided with an outlet 21 adapted for connection with an outlet conduit 22. A pump 23 may be provided in the conduit 22 as indicated by the solid lines to produce a suction flow of fluid through the fitting 10; or, alternatively, a pump 23A as shown by the phantom lines may be provided in the inlet conduit 19 to provide pressure flow. A pair of semi-annular chambers 24 and 25 are provided in the housing 11 each having a portion registering with the central chamber 17. An outlet 26 in the housing 11 provides communication between the semi-annular chamber 25 and a passage 27 provided in a filter assembly housing 28 mounted preferably on the top of the fitting 10 as illustrated by any means such as studs 28A. An inlet 29 is provided in the housing 11 and provides communication between a passage 30 in the filter assembly housing 28 and the semi-annular chamber 24. Fluid is thus directed through the passage 27, through a filter cartridge 28B, and thence back through the passage 30.

The cap member 12 is preferably provided with a boss portion 31 carrying a rod 32 which extends axially into the central chamber 17. The rod 32 is preferably provided with a reduced end portion 33 which carries a piston 34 by any convenient means such as a snap ring 35. A spool valve 36 is slidably carried on the rod 32 and is biased toward the piston 34 by any convenient means such as a spring 37. The spring 37 is preferably seated against a retainer ring 38 secured to the rod 32 by any convenient means such as a pair of snap rings 39. A piston 40 is also slidably carried on the rod 32 and is urged toward the retainer ring 38 by a spring 41. The spring 41 is preferably seated against an annular seat 42 provided in the cap member 12.

The rod 32 has a threaded portion 43 which cooperates with a tapped bore 44 in the cap member 12 to produce axial movement of the rod 32 when a handle 45 secured to the outwardly disposed end of the rod 32, is rotated.

The piston 34 is provided with a flanged portion 46 which rests against a shoulder 47 provided in the housing 11 when the fitting 10 is in its normal operating position as illustrated in FIG. 1. An annular recess 48 in the piston 34 provides a seat for the spool valve 36. As can best be seen in FIG. 6, the piston 34 is provided with a pair of semi-circular openings 49 normally closed by the valve 36. An O-ring seal 50 is carried by the piston 34 to prevent passage of fluid between the housing 11 and the piston 34. Another O-ring seal 51 seats against the cap member 14 when the fitting 10 is in the bypass position illustrated in FIG. 2. Similar O-ring seals 52–53 are provided for the piston 40. The piston 40 is provided with a pressure port 54 and will be discussed later.

An indicator arm 55 is pivotally carried in the housing 11 and has a portion 55A engaging a shoulder 56 provided on the spool valve 36. As can best be seen in FIG. 3 an indicator plate 57 is provided on the outside of the housing 11. The indicator arm is operably connected with a pointer 55B which will move in response to changes in the position of the spool valve 36 with respect to the rest of the fitting.

In operation the fitting 10 will normally be in the position illustrated in FIG. 1 and fluid will flow in a path indicated by the arrows beginning at A. The handle 45 will have been rotated so that the flange portion 46 of the piston 34 will rest against the shoulder portion 47. The spring 37 will be sufficient to retain the spool valve 36 in the recess 48 and thus initially prevent fluid flow through the openings 49. The O-ring seal 50 will prevent fluid flow between the piston 34 and the housing 11. Fluid then will flow through the inlet 18, into the recess 25, out the outlet 26 and to the filter assembly 28 where it will be cleaned. From there it will pass through the inlet 29 into the recess 24, into the central chamber 17 and out the outlet 21.

As the filter 28B becomes clogged, pressure will increase at the inlet 18 if the pump 23A is used, or will decrease at the outlet 21 if the pump 23 is used. Either event will produce an increased pressure differential across the spool valve 36 which will overcome the spring 37 and act to move the valve 36 off its seat 48. Movement will increase proportionately as the filter becomes more clogged until the outward face of the valve passes the inward edge of the recess 48, after which some fluid will begin to by-pass the filter by flowing through the openings 48 in the piston 34. As the spool valve 36 is moved, it will actuate the indicator pointer 55B through the arm 55, which will provide a means of determining the condition of filter 28B by pointing to appropriate indicia provided on the indicator plate 57. The position of the fitting 11 when fluid is by-passing the filter is indicated by the dotted line position shown in FIG. 1.

In the by-pass position, the filter 28B is so clogged that it requires replacement. Turning the handle 45 so that the rod 32 moves axially inwardly will act to seat the piston 34 against the end member 14 as can best be seen in FIG. 2. Fluid entering the inlet 18 is thus prevented from passing into the semi-annular chamber 25 by the O-ring seal 49. The retainer ring 39 is so positioned on the rod 32 that somewhat before the O-ring seal 51 seats against the end member 14, the retainer ring 39 has moved sufficiently inwardly to permit the spring 41 to urge the O-ring seal 52 of the piston 40 against the housing 11, closing off the chamber 24 from the chamber 17. The filter assembly 28 now may be removed, after draining fluid therefrom through drain plugs 60, or its end cap 28C may be removed and the cartridge 28B cleaned or replaced without interfering with the operation of the pump or flow of fluid to the user. After the filter 28B has been replaced, the filter assembly 28 can be refilled with fluid, the cap 28C replaced, and the handle 45 can be turned to move the pistons 34 and 53 from the closed position, restoring normal operation.

It will be noted that the fitting 11 is so arranged that it can be utilized without modification in either the pressure system or the suction system. In the pressure system, using the pump 23A, the pressure in the chamber 17 is prevented from lifting the piston 40 against the action of the spring 41 since the pressure port 54 equalizes the pressure on each side of the piston 40. The larger cross sectional area on the outer side of the piston 40 than on the inner side cooperates with the spring 41 to hold the piston 40, or more properly the O-ring 52 against the housing 11.

Although I have described but one embodiment of the present invention, other changes and modifications will be apparent to one skilled in the art to which the invention pertains without departing from the spirit of the invention or the scope of the appended claims.

I claim:
1. In a fluid system having a fluid supply source, fluid treating means, a fitting component and means circulating fluid from said fluid supply source to said fitting component, said fitting component comprising,
 (a) a housing having a first inlet adapted for connection with said fluid supply source, a first outlet, a second inlet and a second outlet adapted for connection with said treating means,
 (b) said housing further having a chamber provided with ports respectively openly connected to said inlets and said outlets,
 (c) a rod carried by said housing and having means providing for selective axial movement in said chamber,
 (d) a first and a second piston carried by said rod and axially movable therewith to positions opening and closing said ports connected with said second inlet and said second outlet,
 (e) a valve member axially slidably carried on said rod and being disposed between the first inlet and the first outlet and having means movable independently of said pistons and said rod,
 (f) said valve member being automatically operable to openly connect said first inlet with said first outlet in response to a predetermined increase in pressure differential across said valve member.

2. The fitting component as defined in claim 1 and having indicator means operably connected with and actuated by said valve member to indicate the degree of movement thereof.

3. The fitting component as defined in claim 1 and in which
 (a) said second piston has axially extending passages therethrough,
 (b) said valve member comprises a plate slidably carried by said rod,
 (c) said rod carries means resiliently urging said valve to a position closing the ports in said second piston.

4. The fitting component as defined in claim 1 and in which
 (a) said second piston has a cylindrical recess and axially extending passages open to the bottom of said recess,
 (b) said valve member comprises a member slidably carried by said rod and slidably peripherally fitting the recess in said second piston,
 (c) said rod carries means resiliently urging said valve member towards the bottom of said recess,
whereby an appreciable axial movement of said valve member occurs on a pressure differential increase before the valve member is urged thereby out of said recess to bypass fluid through said second piston.

5. In combination with a filter, a fitting comprising
 (a) a housing having a chamber, a first inlet and a first outlet each communicating with said chamber,
 (b) said housing being further provided with a second inlet and a second outlet connecting said filter with said chamber,
 (c) a rod carried by said housing and having means providing for selective axial movement in said chamber intermediate a first position and a second position,
 (d) piston means carried in said chamber by said rod and comprising a first means movable with said rod and operable at said first position of said rod to open fluid flow through said second inlet and at said second position of said rod to close fluid flow through said second inlet,
 (e) said piston means further comprising a second means movable with said rod and operable to open fluid flow through said second outlet at said first position of said rod and to close fluid flow through said second outlet at said second position of said rod, (f) a pressure responsive valve axially slidably carried on said rod and intermediate said first inlet and said first outlet and being movable independently of said piston means in response to increases in the pressure differential between said first inlet and said first outlet from a position closing fluid flow from said first inlet to said first outlet toward a position opening fluid flow therebetween, and (g) means urging said valve toward said closed position.

6. The combination as defined in claim 5 and including means actuated by and indicating the position of said valve resulting from a difference in said pressure conditions.

7. In combination with a filter, a fitting comprising
(a) a housing having a chamber,
(b) means conducting a fluid from said chamber through said filter and back to said chamber,
(c) a rod carried in said housing and having a portion extending into said chamber,
(d) valve means carried by said rod and including a first means axially movable with said rod to a position preventing the flow of fluid from said chamber to said filter and a second means axially movable with said rod to a position preventing fluid flow from said filter to said chamber,
(e) means actuating said flow preventing means carried by said rod exteriorly of said housing,
(f) said housing having a fluid inlet and a fluid outlet, (g) said valve means further comprising a third means axially slidably carried on said rod and being movable thereon independently of the movement of said first and second means and being disposed in said chamber intermediate said inlet and said outlet and being responsive to a pressure increase in fluid entering said filter to open a route between said inlet and said outlet bypassing said filter, (h) said third means further being operable to maintain said bypass route open when fluid is prevented from flowing to and from said filter by said first and second means and including means returning said third means to a closed position upon the flow of fluid to said fitting being stopped.

8. The combination as defined in claim 7 and including means actuated by said third means indicating the flow of fluid through said bypass route.

References Cited by the Examiner
UNITED STATES PATENTS

| | | | |
|---|---|---|---|
| 611,667 | 10/1898 | Watson et al. | 210—133 |
| 1,986,299 | 1/1935 | Steven | 137—599.2 |
| 2,400,200 | 5/1946 | Katcher | 210—130 |
| 2,431,782 | 12/1947 | Walton et al. | 210—90 X |
| 2,936,731 | 5/1960 | Rosaen | 210—90 X |

FOREIGN PATENTS

| | | |
|---|---|---|
| 14,243 | 1896 | Great Britain. |
| 9,033 | 1897 | Great Britain. |

REUBEN FRIEDMAN, *Primary Examiner.*

HERBERT MARTIN, *Examiner.*